US012176648B2

(12) United States Patent
Blankinship et al.

(10) Patent No.: US 12,176,648 B2
(45) Date of Patent: Dec. 24, 2024

(54) CONNECTOR WITH TERMINAL POSITION ASSURANCE

(71) Applicant: J.S.T. Corporation, Farmington Hills, MI (US)

(72) Inventors: Eric Blankinship, Lathrup Village, MI (US); Ping Chen, Novi, MI (US); Gwendolyn Upson, Ypsilanti, MI (US)

(73) Assignee: J.S.T. Corporation, Farmington Hills, MI (US)

( * ) Notice: Subject to any disclaimer, the term of this patent is extended or adjusted under 35 U.S.C. 154(b) by 115 days.

(21) Appl. No.: 17/687,312

(22) Filed: Mar. 4, 2022

(65) Prior Publication Data

US 2022/0285875 A1 Sep. 8, 2022

Related U.S. Application Data

(60) Provisional application No. 63/157,415, filed on Mar. 5, 2021.

(51) Int. Cl.
*H01R 13/436* (2006.01)

(52) U.S. Cl.
CPC ................................ *H01R 13/4362* (2013.01)

(58) Field of Classification Search
CPC .................................................. H01R 13/4362
See application file for complete search history.

(56) References Cited

U.S. PATENT DOCUMENTS

| | | | | |
|---|---|---|---|---|
| 6,811,451 B2 * | 11/2004 | Mase | H01R 13/4362 | 439/752 |
| 7,125,291 B2 * | 10/2006 | Aihara | H01R 13/4362 | 439/752 |
| 8,096,841 B2 * | 1/2012 | Hirano | H01R 13/4361 | 439/752 |
| 10,454,209 B2 * | 10/2019 | Holub | H01R 13/6275 | |
| 10,673,168 B2 * | 6/2020 | Jabrane | H01R 13/4367 | |
| 2002/0193013 A1 | 12/2002 | Mase et al. | | |

OTHER PUBLICATIONS

Extended European Search Report issued in European Application No. 22160329.3, mailed Jul. 15, 2022, 9 pages.

* cited by examiner

*Primary Examiner* — Ross N Gushi
(74) *Attorney, Agent, or Firm* — Sterne, Kessler, Goldstein & Fox P.L.L.C

(57) ABSTRACT

An electrical connector is provided. The electrical connector can include a female housing and a terminal position assurance member forming a pre-installed assembly. The TPA member can be in a final lock position to provide reinforcement or secondary locking for a terminal, and terminal position assurance. A male housing can be provided to receive the assembly.

20 Claims, 17 Drawing Sheets

CONNECTOR WITH TERMINAL POSITION ASSURANCE

CROSS-REFERENCE TO RELATED APPLICATIONS

The present application claims benefit of and priority to U.S. Provisional Patent App. No. 63/157,415, filed Mar. 5, 2021, which is incorporated herein by reference in its entirety for all purposes.

FIELD

The present disclosure relates to connectors. In particular, aspects relate to an electrical connector with terminal position assurance.

BACKGROUND

Electrical connector can be used in various wiring systems. Electrical connectors can include a locking mechanism to maintain coupling between a female housing and a male housing. The female housing can support one or more terminals for connecting to one or more wire ends of the male housing. A terminal position assurance member can be used to assure proper installation and positioning of the terminals in the female housing. The terminal position assurance member can be locked in a position for assuring terminal positioning. Terminal position assurance members can be inserted from a side or a bottom of the female housing, and a portion of the terminal position assurance member can extend outside of the female housing.

BRIEF SUMMARY

One aspect provides a connector that can include a housing, a terminal position assurance member, and an arm extending from the terminal position assurance member. The housing can include a first aperture and a second aperture that can be bound by a retention wall of the housing. The terminal position assurance member can be disposed in the first aperture. The arm can include a first detent and a second detent that can both extend outwardly from the arm. The first detent and second detent can both be disposed on either side of the retention wall in a first position of the terminal position assurance member. In a second position, the first detent and second detent can be disposed in the second aperture of the terminal position assurance member. In an aspect, a flat side surface of the arm between the first detent and the second detent can abut a flat surface of the retention wall in the first position. In another aspect, the arm can be deflected inward toward a base of the terminal position assurance member to move between the first position and the second position. In a further aspect, a flat top edge of the second detent can engage a beveled bottom edge of the retention wall to move from the first position to the second position. In a further aspect, a chamfered bottom edge of the second detent can engage flat top edge of the retention wall to move from the second position to the first position. In an aspect, a bottom flat surface of the arm below the second detent can abut the retention wall in the second position. In another aspect, the first aperture can be intermediate to a front wall and a back wall of the housing. In another aspect, the terminal position assurance member can be fully within the housing in the second position. In another aspect, the connector can include a second housing to receive the first housing and the terminal position assurance member when in the second position.

Another aspect provides a terminal position assurance member. The terminal position assurance member can include a terminal retention base, an arm, a first detent, and a second detent. The arm can be positioned adjacent to the terminal retention base. The first detent can extend outwardly from the arm. The second detent can extend outwardly from the arm and be positioned below the first detent. In an aspect, the terminal retention base can include a terminal retention surface to receive a terminal. In a further aspect, the terminal retention base can include a terminal retention arm adjacent to the terminal retention surface to retain the terminal. In a further aspect, the terminal retention arm can include an inclined surface extending to a back wall of the terminal retention arm. In another aspect, the terminal position assurance member can be entirely within a housing retain a terminal. In another aspect, a bottom edge of the second detent can engage the housing to retain a terminal.

Another aspect provides a method of retaining a terminal in a connector. The method can include providing a terminal position assurance member in a first aperture of a housing; providing a first detent of the terminal position assurance member in a second aperture of the second housing; moving an arm of the terminal position assurance member inward; extending a second detent of the terminal position assurance member into the second aperture; and entirely receiving the terminal position assurance member in the housing. In an aspect, the method can further include receiving the housing in a second housing. In another aspect, the method can further include aligning a bottom surface of the arm with a top surface of a retention wall of the housing. In this aspect, the second aperture can be bound by the retention wall. In another aspect, the method can further include aligning a terminal contact surface of the terminal position assurance member with a terminal contact surface of the housing. In another aspect, a terminal retention arm can extend to a first height above a second height of the terminal contact surface. In this aspect, the terminal retention arm can exert a force on the terminal to prevent withdrawal of the terminal.

BRIEF DESCRIPTION OF THE DRAWINGS/FIGURES

The accompanying drawings, which are incorporated herein and form part of the specification, illustrate aspects and, together with the description, further serve to explain the principles of the aspects and to enable a person skilled in the relevant art(s) to make and use the aspects.

Figure 1:
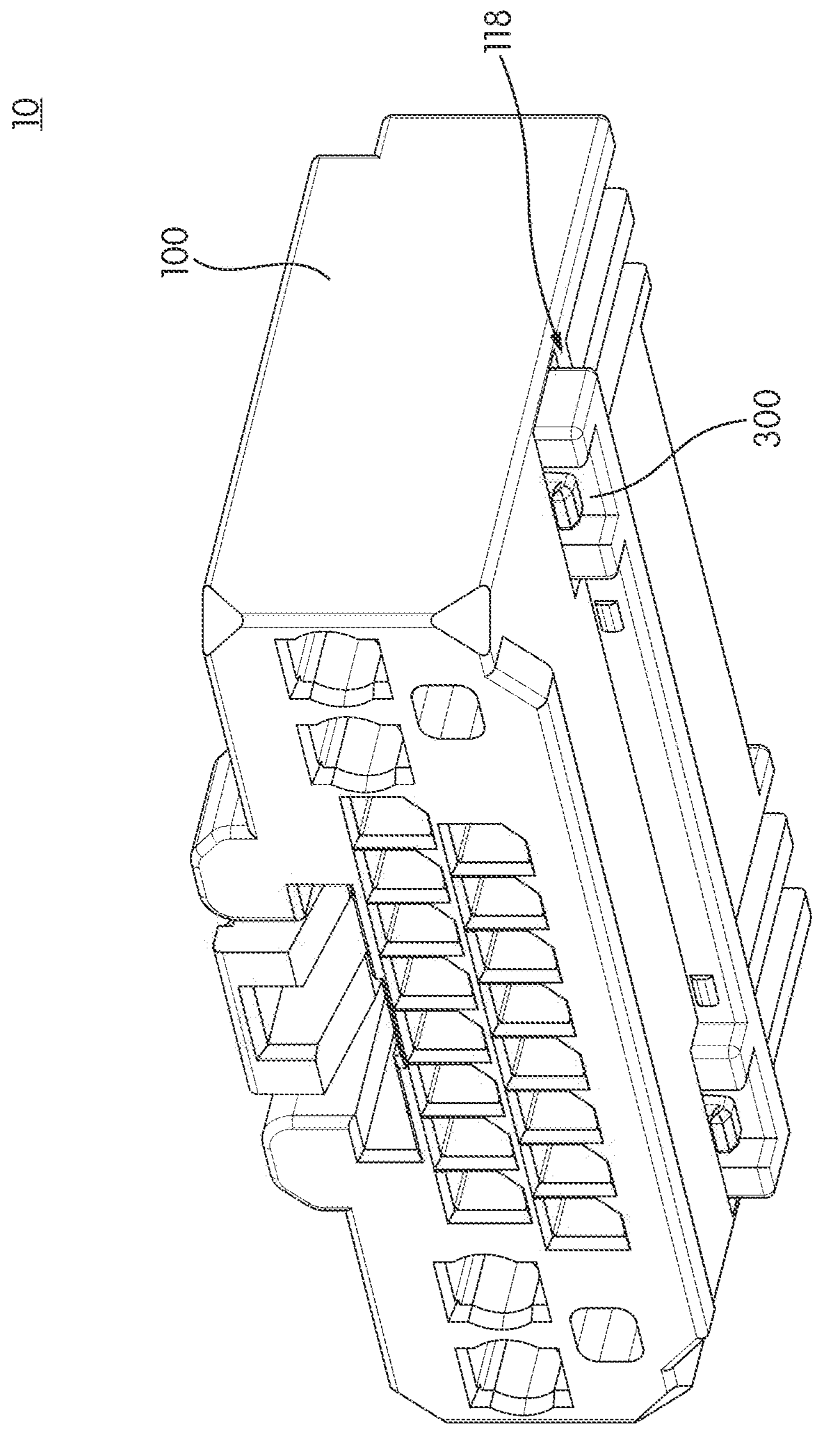
FIG. 1 is a perspective view of a female connector housing and terminal position assurance member according to various aspects.
Figure 2A:
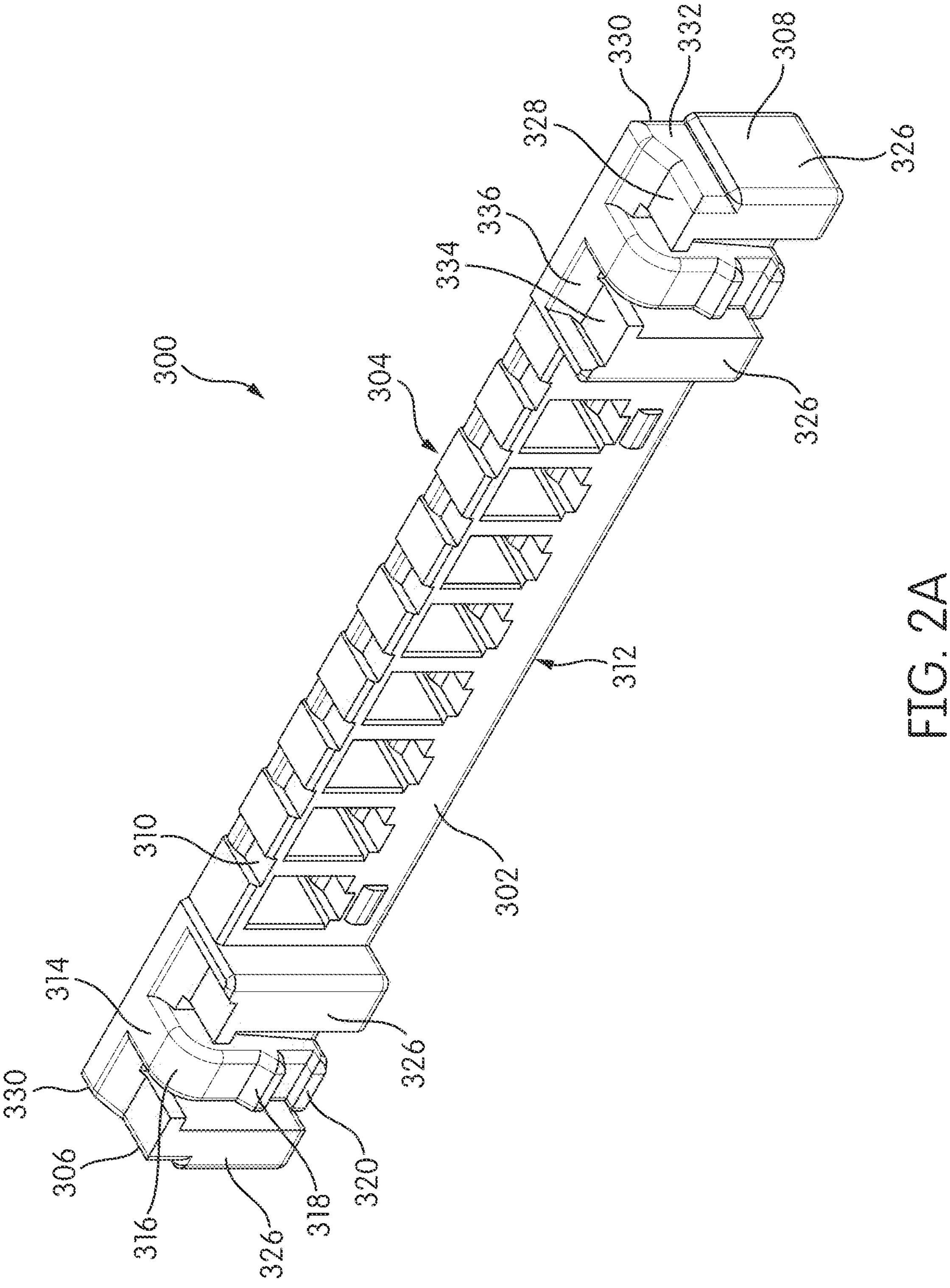
FIG. 2A is a perspective view of a terminal position assurance member according to various aspects.
Figure 2B:
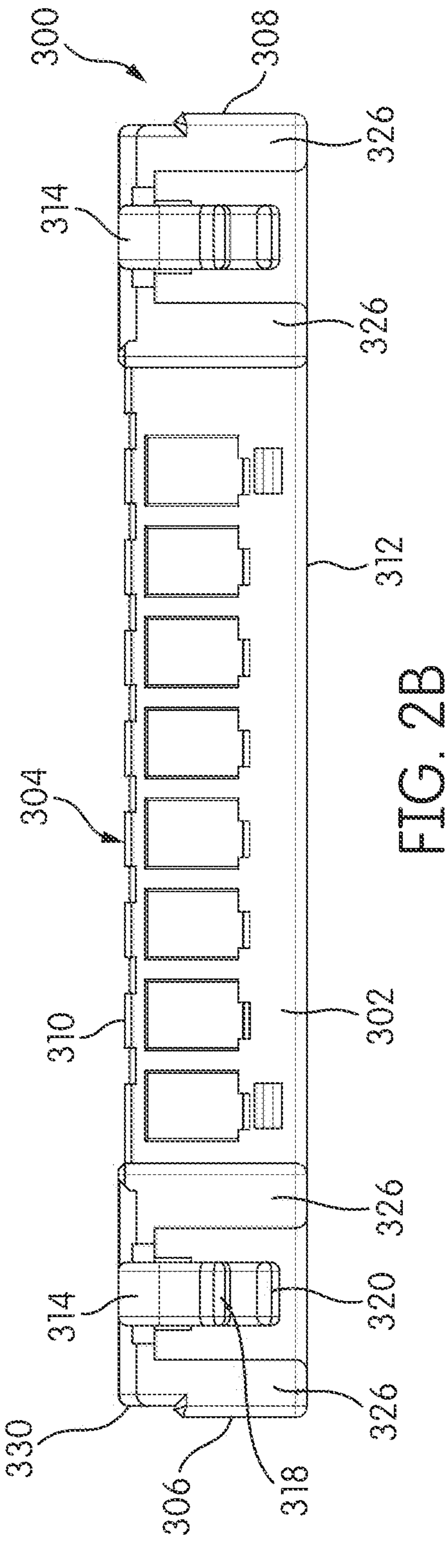
FIG. 2B is a front view of the terminal position assurance member of FIG. 1.
Figure 2C:
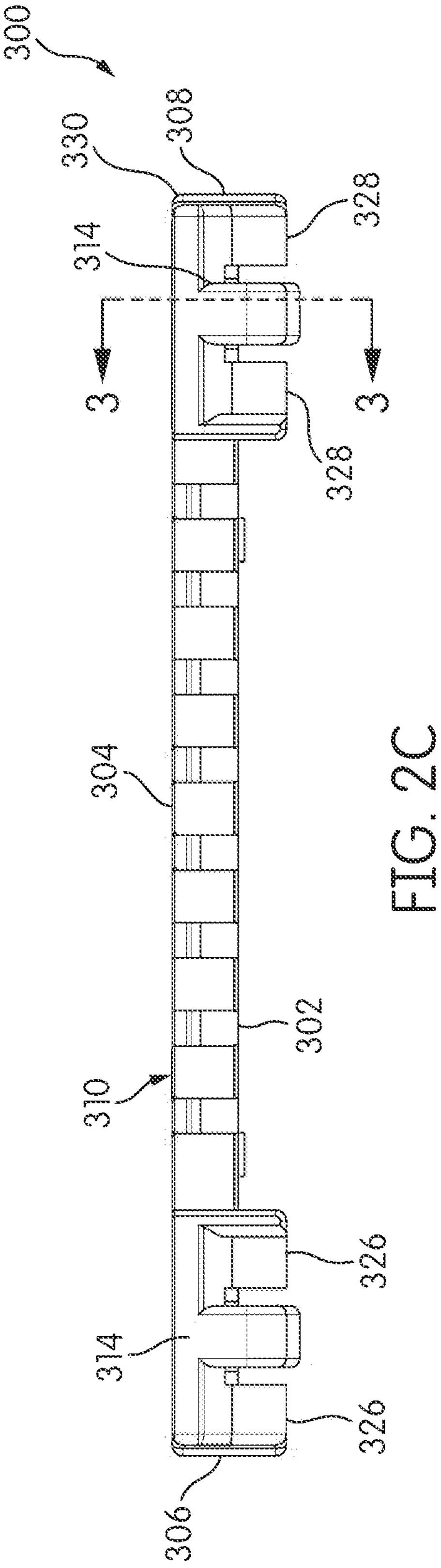
FIG. 2C is a top view of the terminal position assurance member of FIG. 1.
Figure 2D:
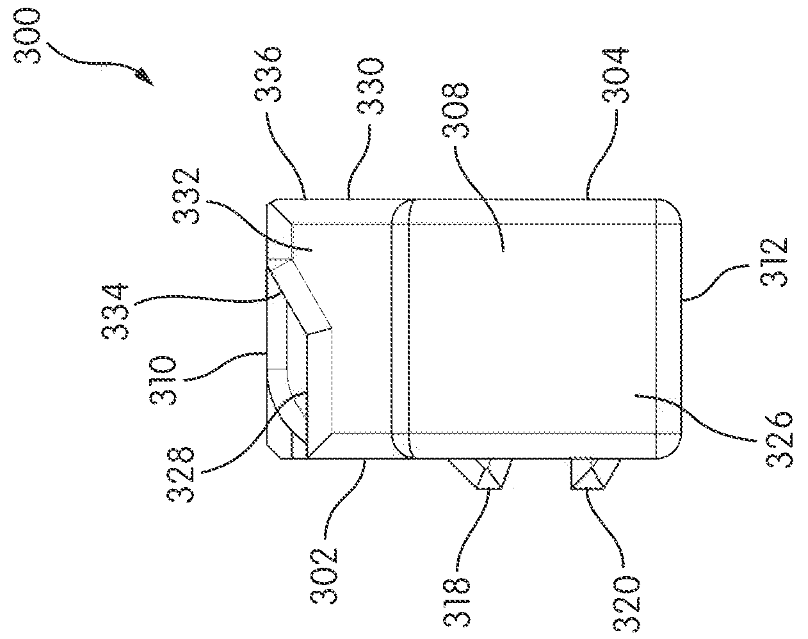
FIG. 2D is a side view of the terminal position assurance member of FIG. 1.

The features and advantages of the aspects will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

The present invention(s) will now be described in detail with reference to aspects thereof as illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

As used herein, the term "approximately" is inclusive of the number to which it refers and includes numbers that bound and are within a range of 5%, 10%, 15%, or 20% except where such number would exceed 100% of a possible value.

Aspects provide an electrical connector for wiring systems, such as a vehicle wiring system. The electrical connector described herein can have improved terminal position assurance. The improved terminal position assurance can ensure terminal connections and prevent unintended withdrawal.

The electrical connector can include a female housing, a male housing, and a terminal position assurance member ("TPA member"). The female member and the TPA member can form an assembly that can be coupled to the male housing. The TPA member can maintain proper terminal positioning within the housings. Terminal segments containing wire terminals can include a primary lock to maintain their position in a housing, ensuring proper mating. In an aspect, the TPA member can reinforce the primary lock. In another aspect, a TPA member can be a secondary lock. Advantageously, feedback (e.g., visual, tactile, and/or audible feedback) can be provided to signal that the TPA member is in a final lock position so that a terminal can be installed with terminal position assurance. In the final lock position, the TPA member can be fully within the female housing. In another aspect, a portion of the TPA member can extend outside the female housing. Once the terminal segments are installed, the TPA member can be in a final lock position in which the TPA member can be in blocking engagement with the terminal segments to prevent the terminal segments from being unintentionally removed from the female housing.

The male housing can include a front and a rear. An aperture for receiving the female housing and TPA member assembly can extend from the front to a portion between the front and the rear. The female housing can include a front, a rear, a bottom, and a top. One or more terminal apertures can extend from the front to the rear of the female housing to receive one or more terminal segments. Another aperture can extend from the bottom to a portion between the bottom and the top of the female housing to receive the TPA member. In this way, the electrical connector can support a TPA member that is inserted in a direction alternative to the direction of coupling between the female housing and the male housing. The aperture in which the TPA member is disposed can intersect the terminal apertures such that the TPA member can support the terminal segments disposed in the terminal apertures.

As described herein, the assembly including the female housing and the TPA member can be pre-installed. Accordingly, a user does not have to couple the TPA member to the female housing. The TPA member can be in a pre-lock position prior to being moved into a position to provide terminal position assurance. In the pre-lock position, a portion of the TPA member can extend outwardly from the bottom of the female housing. In other aspects, the TPA member can be inserted from another side of the female housing, e.g., the front or the rear. In an aspect, the male housing can include an additional TPA member.

In a final lock position, the TPA member can provide terminal position insurance. The TPA member can move to the final lock position where it can be fully within the female housing. In an aspect, the terminal segments can be inserted through the female housing terminal apertures in the pre-lock position, however, the TPA member can be prevented from moving to the final lock position if one or more terminal segments are partially mated. In an aspect, the terminal segments can block the TPA member from being moved to the final lock position if the terminal segments are only partially mated. Thus, in an aspect, for the TPA member to move to the final lock position, the terminal segments must be fully installed. When the terminal segments are fully installed, the terminal segments do not block the TPA member from moving to the final lock position. Accordingly, the terminal segments can be installed while the TPA member is in the pre-lock position. Once the terminal segments are installed, the TPA member can be moved to the final lock position. In an aspect, the terminal segments can be prevented from being inserted through the female housing terminal apertures if the TPA member is in the final lock position.

Because a portion of the TPA member can extend outwardly from the bottom of the female housing in the pre-lock position, the assembly can be prevented from clearing the bottom of the male housing. In this way, the male housing can be prevented from receiving the female housing and TPA member in the pre-lock position to mate the male housing to the female housing. The visible feedback of a portion of the TPA member extending outwardly from the bottom of the female housing can indicate the pre-lock position of the TPA member. Accordingly, the visible feedback can indicate that the TPA member is not in a final lock position to provide terminal position assurance. Once the TPA member is in the final lock position and the TPA member is fully within the female housing, the male housing can receive the assembly. This can provide further assurance that the electrical connector comprises one or more terminal segments installed with position assurance. In addition, the overall size of the electrical connector can be reduced by disposing the entire TPA member within the female housing, for example, so the connector can have a low profile. This is beneficial in vehicle wiring systems, for example, that are complex and require numerous components with high reliability, but space is limited.

The female housing can also include a retention aperture. In an aspect, the retention aperture can be within the female housing and extend from the front of the female housing to the aperture in which the TPA member is disposed. Accordingly, the two apertures can intersect. In another aspect, the retention aperture can extend from the aperture in which the TPA member is disposed to a portion of the female housing between the aperture in which the TPA member is disposed and the front of the female housing. In another aspect, the retention aperture can extend from the aperture in which the TPA member is disposed to a portion of the female housing between the aperture in which the TPA member is disposed and the rear of the female housing.

The TPA member can include a cantilevered lock arm having a locking surface from which a retention detent extends outwardly. To retain the TPA member, the retention detent of the TPA member can extend into the retention aperture of the female housing and engage with a retention wall of the female housing that can form a boundary of the retention aperture. In an aspect, the retention wall can be a lower boundary of the retention aperture. The TPA member can be prevented from being removed from the female housing aperture because of the interference between the retention detent and the retention wall. Pre-installation of the female housing and TPA member assembly can include installing the TPA member to be retained by the female housing in this way.

The lock arm can additionally include a locking detent that can engage the retention wall of the female housing to move the TPA member fully within the female housing and into the final lock position. To lock the TPA member, the lock arm can be deflected inward away from its biased position such that the locking detent can clear the retention wall of the female housing and the TPA member can be moved into the female housing aperture. In an aspect, moving the TPA member into the female housing aperture can cause the lock arm to deflect inward. The TPA member can be prevented from moving further into the female housing by the aperture sidewalls that receive the TPA member. Once the TPA member is moved into the female housing aperture, the lock arm can be deflected outward to its biased position and the locking detent can join the retention detent in the retention aperture. When both the retention detent and the locking detent are disposed in the retention aperture, the TPA member can be fully within the female housing and the TPA member can be in the final lock position. In the final lock position, the TPA member can be prevented from being removed from the female housing aperture because of the interference between the locking detent and the retention wall.

The geometry of the retention wall and the lock arm can support movement of the TPA member between the pre-lock position and the final lock position. The retention detent can have a beveled bottom edge that can engage with a flat top edge of the retention wall. In this way, the lock arm can clear the retention wall to deflect inward. The locking detent can have a flat top edge that can engage with a beveled bottom edge of the retention wall to move the TPA member into the female housing when the lock arm is deflected inward. Similarly, the locking detent can have a chamfered bottom edge that can engage with the flat top edge of the retention wall to deflect the lock arm inward such that TPA member can be pulled out of the female housing. This can release the TPA member from the final lock position to facilitate resetting or maintenance.

In addition, the overall size of the electrical connector can be reduced by disposing the locking detent within the female housing Instead of positioning the locking detent outside of or on an exterior surface of the female housing, the locking detent can be within the retention aperture inside the female housing. Accordingly, the connector can have a low profile when the TPA member is in the final lock position. The low profile of the connector described herein, aided by positioning the locking detent in the interior of the female housing is beneficial in vehicle wiring systems, for example, that are complex and require numerous components with high reliability, but space is limited.

The TPA member can additionally include one or more terminal retention bases that can be adjacent to the lock arm. The terminal retention bases can both protect and provide support to the lock arm. The geometry of the terminal retention bases can support installation of the terminal with position assurance. A terminal contact surface of a terminal retention base can adjoin terminal contact surfaces of the female housing in the terminal apertures. The terminal contact surfaces can receive the terminal segments, which can then advance through the terminal apertures, guided by an inclined guide surface of the terminal retention base. The inclined guide surface can form a part of a terminal retention arm, which can extend upward from the terminal retention base. As described herein, the upward direction can be a longitudinal direction generally parallel to a longitudinal axis. A terminal retention contact surface of the back wall of the terminal retention base can be in blocking engagement with the terminal segments once the terminals are installed. The terminal retention contact surface can exert a force on the terminal segments to provide reinforcement/secondary locking and prevent removal. Accordingly, the TPA member in the final lock position can provide assurance that the position of the terminals are maintained and that the terminal segments cannot be unintentionally removed. This can provide improved terminal mating.

Audible feedback (e.g., a click sound) can be provided to signal that the TPA member is in the final lock position. In addition, tactile and/or visual feedback can be provided to indicate that the TPA member is in the final lock position. For example, the entire TPA member being within the female housing in the final lock position can provide a visual signal that a terminal is installed with terminal position assurance. By receiving this feedback, the terminal segments can thereafter be installed with assurance that reinforcement/ secondary locking will be provided and that terminals will be installed with terminal position assurance.

A pre-installed assembly having a female housing 100 and a TPA member 300 is shown in FIG. 1. Female housing 100 can include a TPA member aperture 118 to receive TPA member 300. TPA member 300 can be partially disposed in female housing 100 such that TPA member 300 can be in a pre-lock position 10. In a final lock position 20 (FIG. 9), TPA member 300 can be entirely disposed in female housing 100.

As shown in FIGS. 2A—D, TPA member 300 can include a front 302, a rear 304, a first side 306, a second side 308, a top 310, a bottom 312, one or more lock arms 314, and one or more terminal retention bases 326. Each lock arm 314 can include a locking surface 316, a retention detent 318, and a locking detent 320. Each terminal retention base 326 can include a terminal contact surface 328, a back wall 330, and a terminal retention arm 332 having a terminal retention contact surface 334, and a guide surface 336.

A terminal retention arm 332 can extend upwardly in a longitudinal direction generally parallel to longitudinal axis 9 (FIG. 11) from a terminal retention base 326. In some aspects, a terminal contact surface 328 can be generally flat and can be adjacent to terminal retention arm 332. In an aspect, guide surface 336 of terminal retention arm 332 can be inclined. In another aspect, back wall 330 of terminal retention base 326 can include terminal retention contact surface 334 of terminal retention arm 332. In an aspect, terminal retention contact surface 334 can exert a force on an installed terminal supported by terminal segment 402 (FIG. 15) connected to wires 400 to provide reinforcement/secondary locking and prevent removal. Accordingly, terminal segments 402 can be in blocking engagement with TPA member 300 such that it is retained and prevented from being unintentionally removed. The blocking engagement will be described in further detail below.

Terminal retention bases 326 can be positioned adjacent to lock arms 314. In some aspects, a lock arm 314 can be positioned adjacent to a terminal retention base 326 on one or both sides. In this way, each terminal retention base 326 can protect and support lock arm 314.

Figure 3:
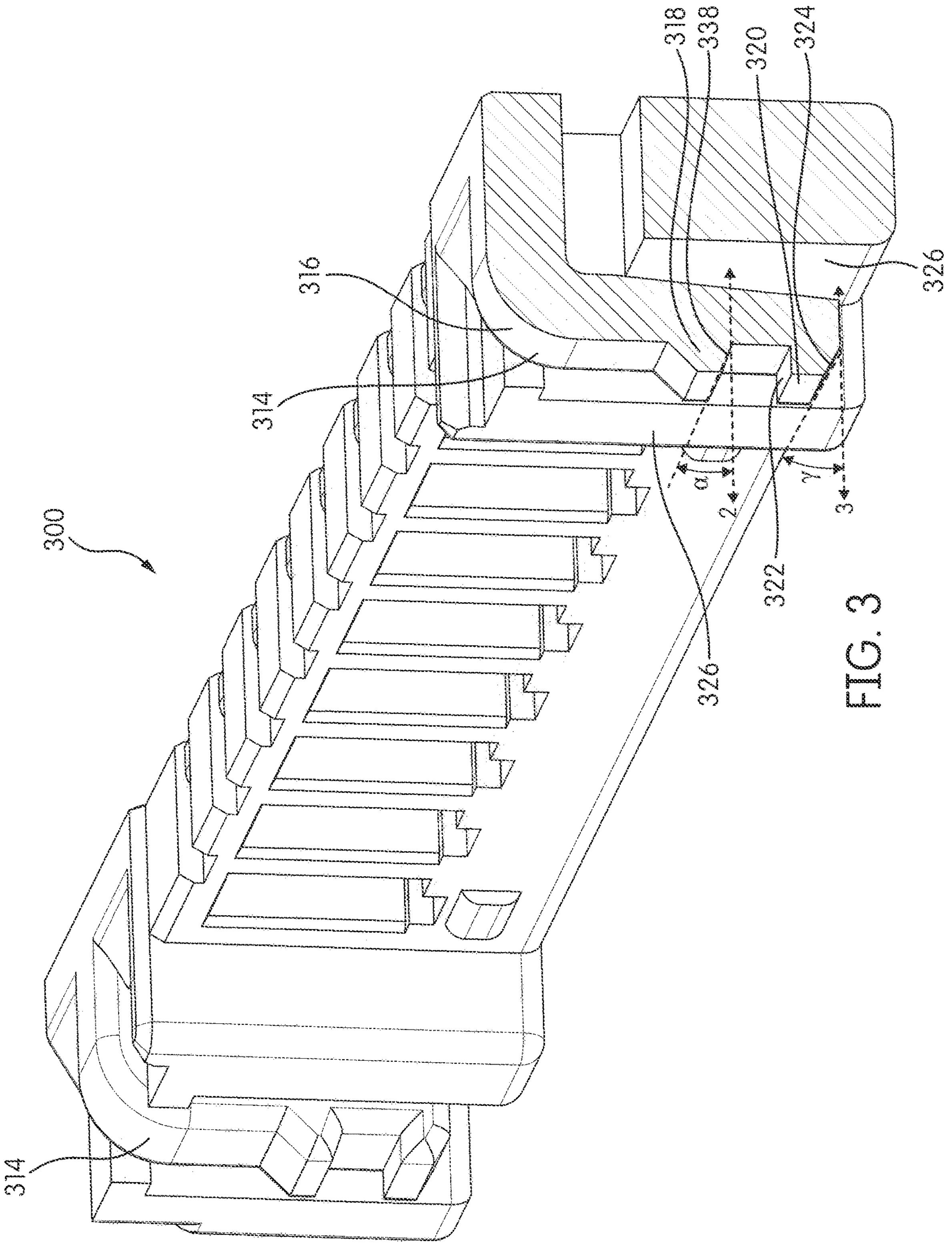
FIG. 3 is a section view of the terminal position assurance member in FIG. 2C along line 3-3.

As shown in FIG. 3, lock arms 314 can be cantilevered. Lock arms 314 can have a biased position shown in FIG. 3, and can deflect inward away from the biased position. Retention detents 318 and locking detents 320 can extend outwardly from locking surfaces 316 of lock arms 314. A retention detent 318 can include a bottom edge 338. In an aspect, bottom edge 338 can be beveled. In some aspects, bottom edge 338 can be at a bevel angle, a, from an axis 2 of retention detent 318. In some aspects, the bevel angle, a, can range from approximately 5 degrees to approximately 60 degrees, such as approximately 15 degrees to approximately 45 degrees, such as approximately 30 degrees. A locking detent 320 can include a top edge 322 and a bottom edge 324. In an aspect, top edge 322 can be flat. In another aspect, bottom edge 324 can be chamfered. In some aspects, bottom edge 324 can be at a chamfer angle, y, from an axis 3 of locking detent 320. In some aspects, chamfer angle, y, from an axis 3 of locking detent 320 can be an acute angle. In some aspects, the chamfer angle, y, can range from approximately 5 degrees to approximately 60 degrees, such as approximately 15 degrees to approximately 45 degrees, such as approximately 30 degrees.

Figure 4:
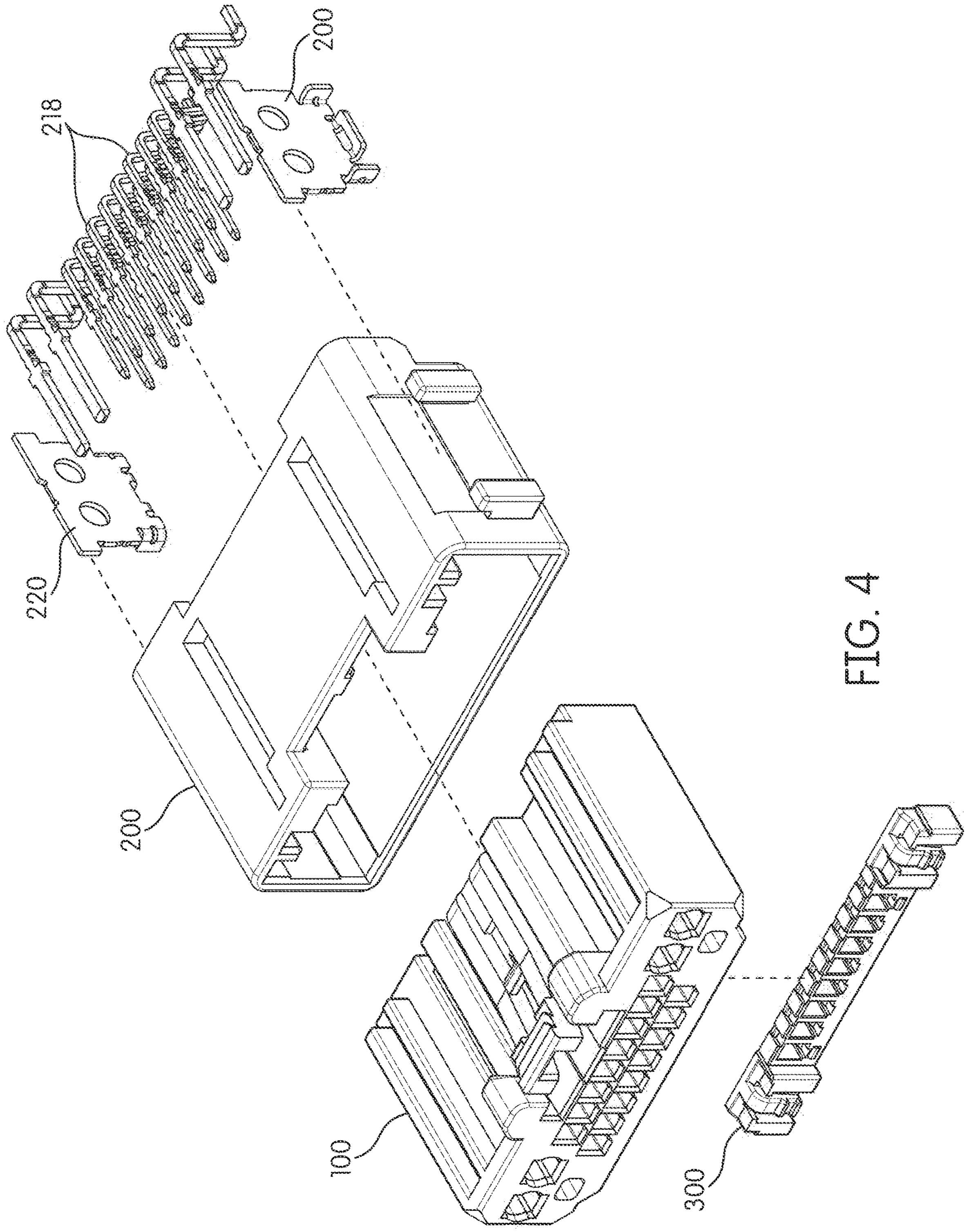
FIG. 4 is an assembly view of a connector according to various aspects.

As shown in FIG. 4, an electrical connector can include female housing 100, TPA member 300, and a male housing 200. In some aspects, the components can be injection molded plastic. Male housing 200 can support reinforcement tabs 220 and male pins 218. Male housing 200 can receive the pre-installed assembly of female housing 100 and TPA member 300 to couple male housing 200 to female housing 100.

Figure 5:
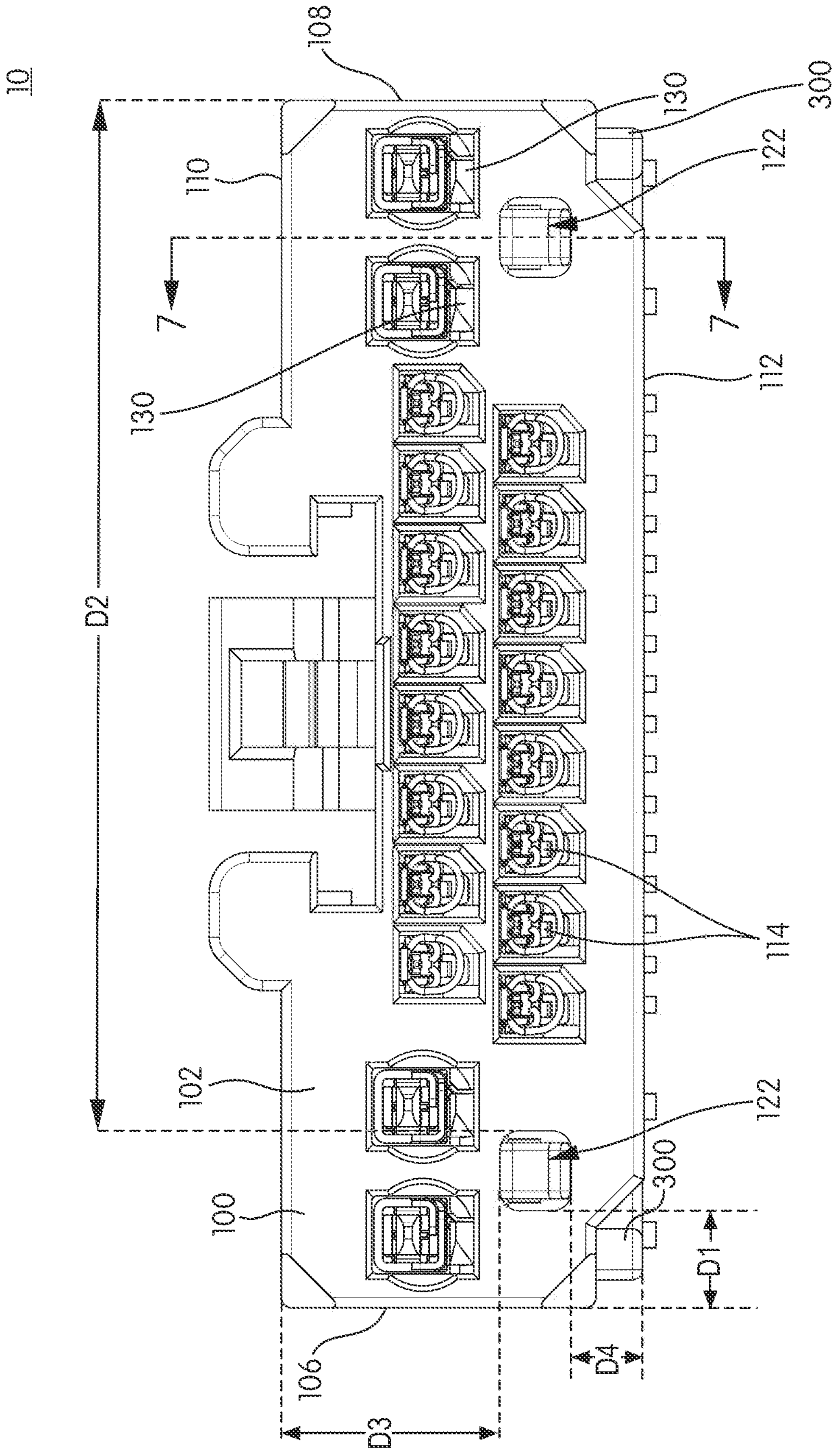
FIG. 5 is a front view of the female connector housing and terminal position assurance member of FIG. 1.
Figure 6:
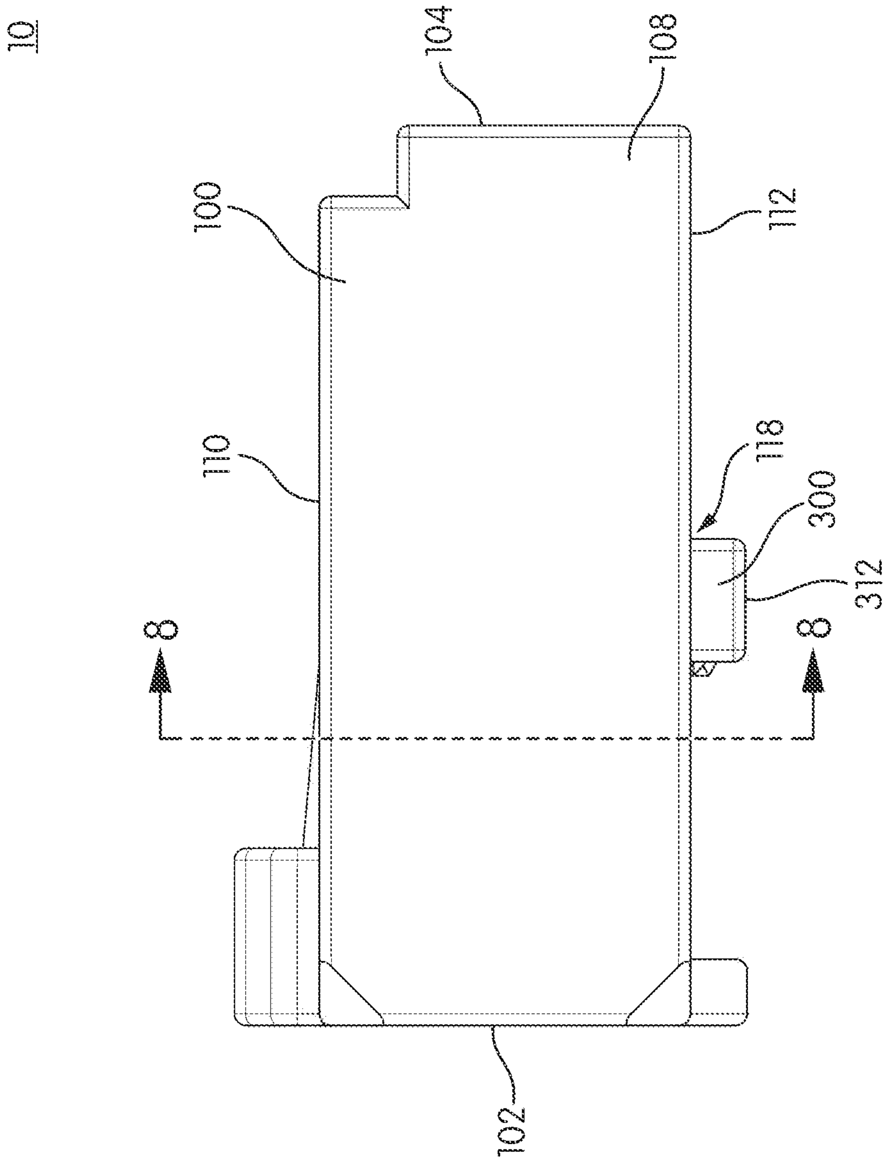
FIG. 6 is a side view of the female connector housing and terminal position assurance member of FIG. 1.

As shown in FIGS. 5-6, female housing 100 can include a front 102, a rear 104, a first side 106, a second side 108, a top 110, and a bottom 112.

Figure 7:
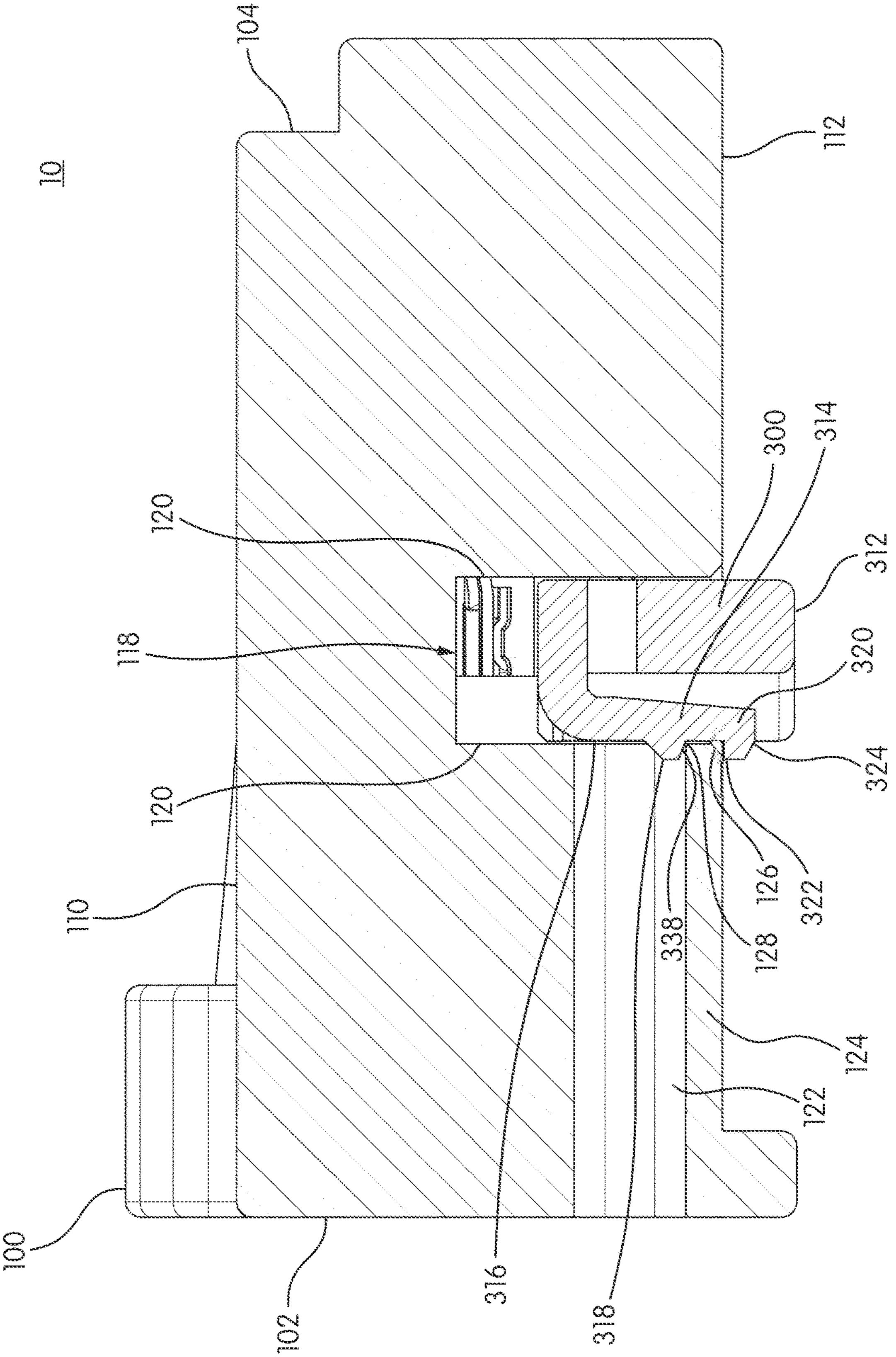
FIG. 7 is a side cross-sectional view of the female connector housing and terminal position assurance member in FIG. 5 along line 7-7.

With reference to FIGS. 5 and 7, female housing 100 can additionally include one or more retention apertures 122 and a retention wall 124. TPA member aperture 118 can include aperture sidewalls 120. Retention wall 124 can include a top edge 128 and a bottom edge 126.

As shown in FIG. 7, TPA member aperture 118 can extend from bottom 112 of female housing 100 to a position between bottom 112 and top 110 of female housing 100. TPA member aperture 118 can additionally be intermediate to front 102 and rear 104 of female housing 100, and intermediate to first side 106 and second side 108 of female housing 100.

In pre-lock position 10, TPA member 300 can be partially disposed in TPA member aperture 118. Accordingly, bottom 312 of TPA member 300 can extend below bottom 112 of female housing 100. Visual feedback of TPA member 300 being partially disposed in female housing 100 can signal that TPA member 300 is in pre-lock position 10. TPA member 300 can be disposed in TPA member aperture 118 such that TPA member 300 can fit between aperture sidewalls 120. A clearance can exist between aperture sidewalls 120 and TPA member 300 to allow TPA member 300 to move within TPA member aperture 118.

With reference to FIG. 5, one or more retention apertures 122 can be within female housing 100. In an aspect, retention apertures 122 can extend from front 102 of female housing 100 to a portion of female housing 100 between front 102 and rear 104 of female housing 100. In an aspect, retention apertures 122 can intersect TPA member aperture 118 at a portion of female housing 100 intermediate to front 102 and rear 104 of female housing 100. As shown in FIG. 5, retention apertures 122 can be intermediate to first side 106 and second side 108 of female housing 100. In an aspect, a retention aperture 122 can be at a distance D1 from first side 106, and at a distance D2 from second side 108. In an aspect, retention apertures 122 can be intermediate to top 110 and bottom 112 of female housing 100. In an aspect, a retention aperture 122 can be at a distance D3 from top 110, and at a distance D4 from bottom 112. In an aspect, D3 can be greater than D4.

Figure 11:
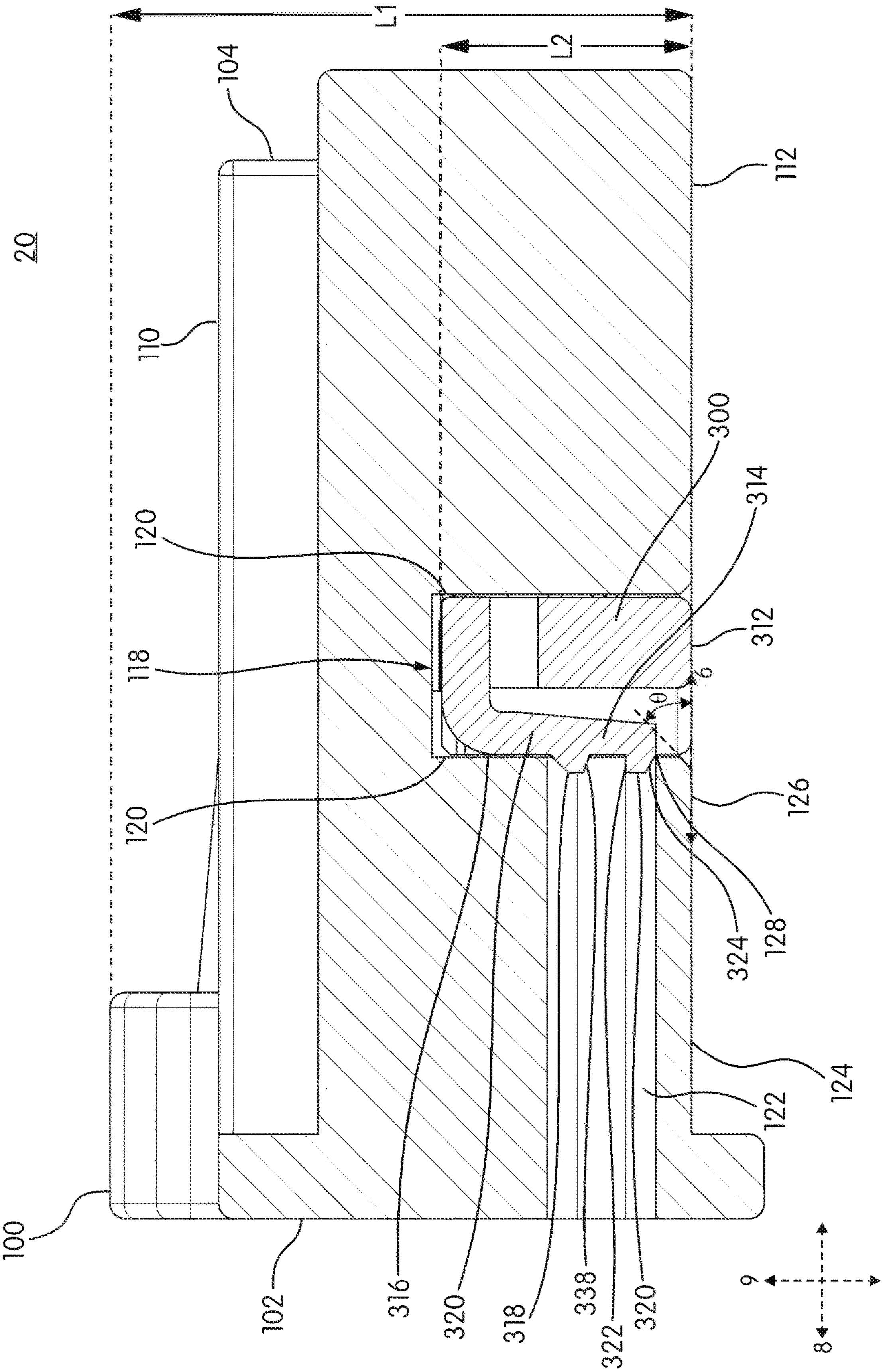
FIG. 11 is a side cross-sectional view of the female connector housing and terminal position assurance member in FIG. 9 along line 11-11.

With reference to FIG. 7, in an aspect, a thickness L1 of female housing 100 in a longitudinal direction generally parallel to longitudinal axis 9 (FIG. 11) can be larger than a thickness L2 of TPA member 300 in the same direction. Accordingly, TPA member 300 can be received by female housing 100 from pre-lock position 10 (FIG. 7) to final-lock position 20 (FIG. 11).

In an aspect, retention apertures 122 can extend from front 102 to TPA member aperture 118. In another aspect, retention apertures 122 can extend from TPA member aperture 118 to a portion of female housing 100 between TPA member aperture 118 and front 102 of female housing 100. In another aspect, retention apertures 122 can extend from TPA member aperture 118 to a portion of female housing 100 between TPA member aperture 118 and rear 104 of female housing 100. In another aspect, retention apertures 122 can extend from TPA member aperture 118 to a portion of female housing 100 between TPA member aperture 118 and first side 106 of female housing 100. In another aspect, retention apertures 122 can extend from TPA member aperture 118 to a portion of female housing 100 between TPA member aperture 118 and second side 108 of female housing 100. Accordingly, retention apertures 122 can be recessed within female housing 100 and can extend from TPA member aperture 118 toward one or more sides of female housing 100.

In pre-lock position 10, a retention detent 318 of a lock arm 314 can be disposed in a retention aperture 122. Retention detent 318 can engage with retention wall 124 of female housing 100 to support TPA member 300 within female housing 100. In an aspect, bottom edge 338 of retention detent 318 can engage with top edge 128 of retention wall 124. In this way, retention wall 124 can be a lower boundary of retention aperture 122. In an aspect, top edge 128 of retention wall 124 can be flat. Accordingly, in some aspects, beveled bottom edge 338 of retention detent 318 can engage with flat top edge 128 of retention wall 124 to retain TPA member 300 within female housing 100. In some aspects, retention wall 124 can form part of bottom 112 of female housing 100.

To move TPA member 300 from pre-lock position 10 to final lock position 20 (FIG. 9), in which TPA member 300 can be entirely disposed within female housing 100, lock arms 314 can deflect inward away from the biased position. In some aspects, bottom edge 338 of retention detents 318 can be beveled to pass flat top edge 128 such that lock arms 314 can be deflected inward.

In an aspect, locking surfaces 316 of lock arms 314 can be flat between retention detents 318 and locking detents 320. In an aspect, in pre-lock position 10 flat locking surfaces 316, between retention detents 318 and locking detents 320, can engage retention wall 124. Accordingly, in pre-lock position 10, retention detents 318 and locking detents 320 of lock arms 314 can be on either side of retention wall 124, as retention detents 318 can be disposed above retention wall 124 in retention apertures 122 and locking detents 320 can be disposed below retention wall 124. In some aspects, because retention wall 124 can form part of bottom 112 of female housing 100, locking detents 320 can be disposed below bottom 112 in pre-lock position 10.

Locking detents 320 can engage with retention wall 124 of female housing 100 to move TPA member 300 from pre-lock position 10 to a final lock position 20 (FIG. 9), in which TPA member 300 can be disposed fully within female housing 100. In an aspect, bottom edge 126 of retention wall 124 can be chamfered. In some aspects, bottom edge 126 can be at a chamfer angle, θ, from an axis 6 of retention wall 124 (FIG. 11). In some aspects, chamfer angle, θ, from an axis 6 of retention wall 124 can be an acute angle. In some aspects, the chamfer angle, θ, can range from approximately 5 degrees to approximately 60 degrees, such as approximately 15 degrees to approximately 45 degrees, such as approximately 30 degrees. In some aspects, bottom edge 126 of retention wall 124 can be chamfered to allow flat top edge 322 of locking detent 320 to pass such that TPA member 300 can move from pre-lock position 10 to final lock position 20 (FIG. 9), in which TPA member 300 can be fully disposed within female housing 100.

Figure 8:
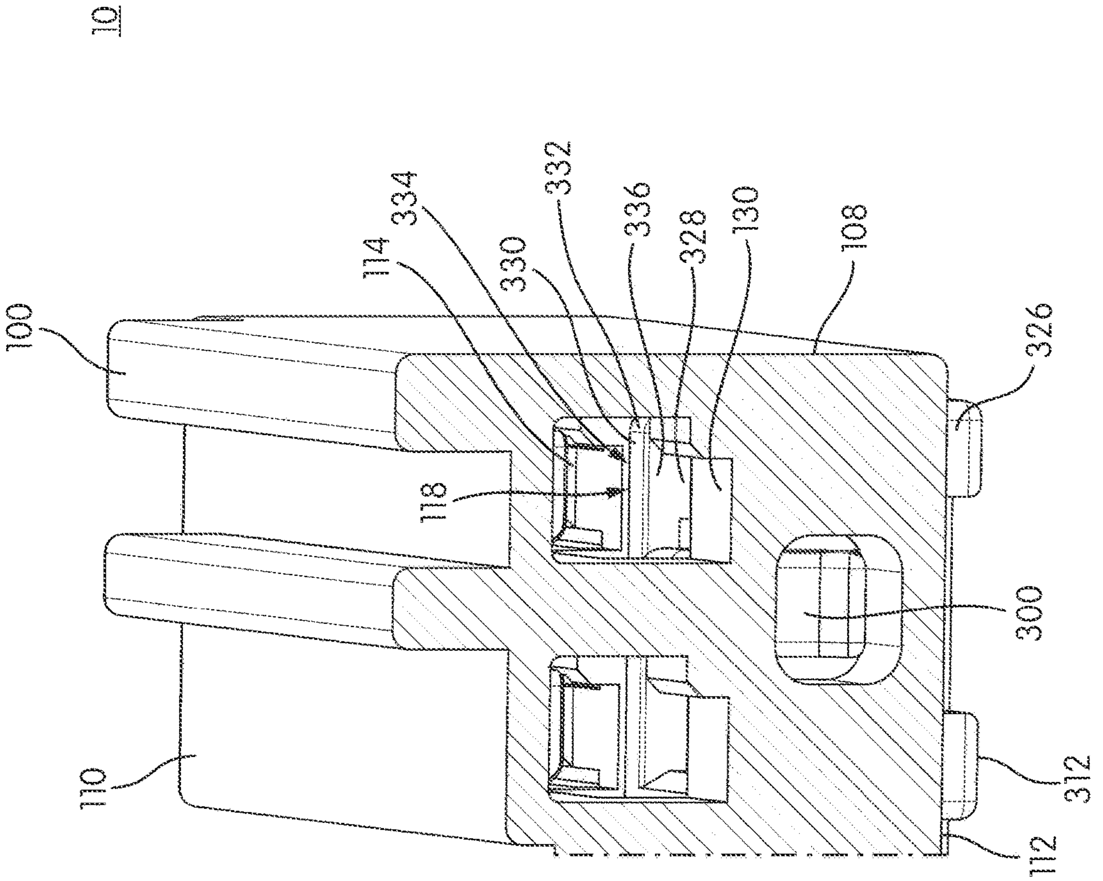
FIG. 8 is a perspective cross-sectional view of the female connector housing and terminal position assurance member in FIG. 6 along line 8-8.
Figure 13:
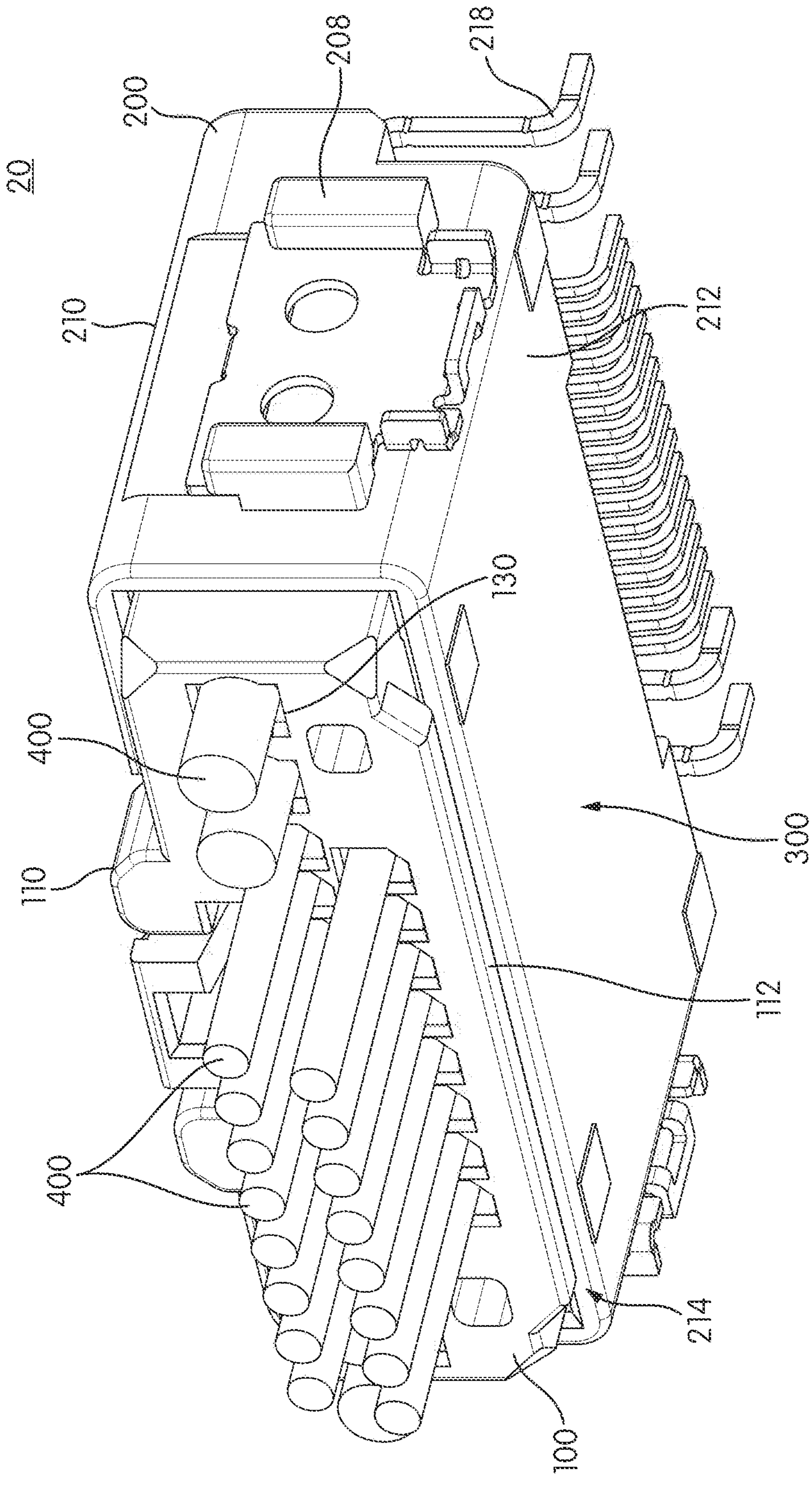
FIG. 13 is a perspective view of the connector of FIG. 4.
Figure 14:
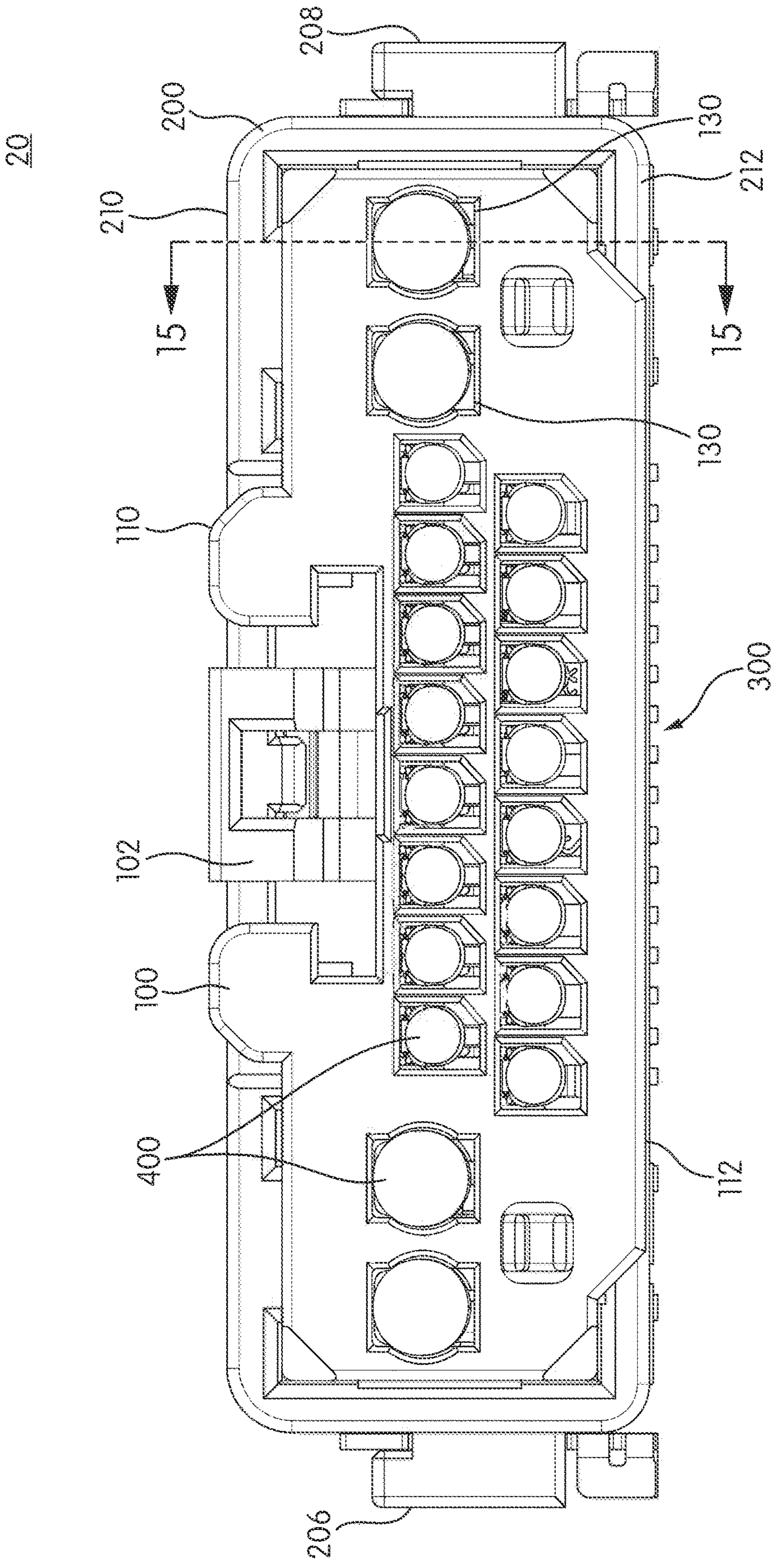
FIG. 14 is a front view of the connector of FIG. 4.
Figure 15:
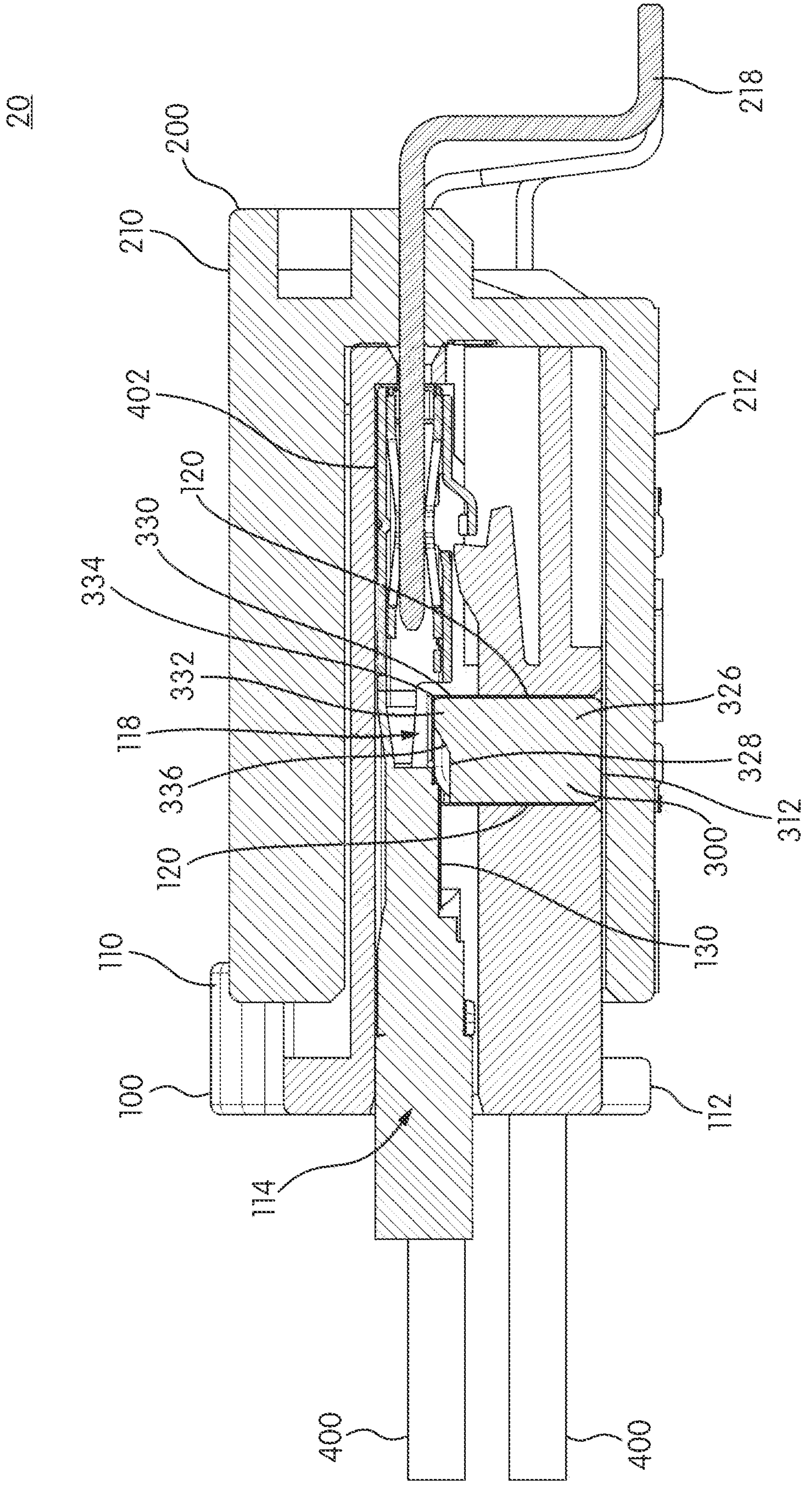
FIG. 15 is a side cross-sectional view of the connector in FIG. 14 along line 15-15.

With reference to FIGS. 5-6 and 8, female housing 100 can additionally include one or more terminal apertures 114 and one or more terminal contact surfaces 130. Terminal apertures 114 can receive terminal segments 402 (FIGS. 13-15). Terminal apertures 114 can extend from front 102 of female housing 100 to a portion of female housing 100 between front 102 and rear 104 of female housing 100. In an aspect, terminal apertures 114 can intersect TPA member aperture 118 at a portion of female housing 100 intermediate to front 102 and rear 104 of female housing 100. Terminal contact surfaces 130 can be within terminal apertures 114.

As shown in FIG. 8, in some aspects, terminal contact surfaces 130 can border terminal contact surface 328 of TPA member 300. In some aspects, in pre-lock position 10, terminal contact surfaces 130 can be positioned above terminal contact surface 334 of terminal retention base 326. Accordingly, terminal contact surface 334 can be disposed in TPA member aperture 118 below terminal apertures 114. In pre-lock position 10, terminal segments 402 (FIG. 15) can be inserted into female housing 100 through terminal apertures 114 and can be received by terminal contact surfaces 130.

Terminal segments 402 can extend through terminal apertures 114. Because terminal apertures 114 can intersect TPA member aperture 118, terminal segments 402 can intersect terminal aperture 118. In some aspects, because terminal contact surface 334 can be below terminal contact surfaces 130 and not in terminal apertures 114, in pre-lock position 10, 402 terminal segments 402 can extend through terminal apertures 114 without contacting terminal contact surface 334. Accordingly, in some aspects, terminal contact surface 334 is not within terminal apertures 114 as terminal contact surfaces 130 such that it can receive 402 terminal segments 402 in pre-lock position 10.

Terminal segments 402 can be disposed in terminal apertures 114 in pre-lock position 10. Once terminal segments 402 are installed in terminal apertures 114, TPA member 300 can be moved upward in a longitudinal direction generally parallel to longitudinal axis 9 (FIG. 11) within TPA member aperture 118 to provide reinforcement or secondary locking to terminal segments 402. If terminal segments 402 are not fully installed, and are only partially mated, TPA member 300 can be blocked from moving into female housing 100. Instead, similar to terminal contact surface 334, in some aspects, terminal retention arm 332 of terminal retention base 326 can be positioned below terminal contact surfaces 130 of female housing 100 in pre-lock position 10.

Terminal retention arm 332 of TPA member 300 can provide the blocking engagement with terminal segments 402 to provide reinforcement/secondary locking and prevent unintentional removal of terminal segments 402. Accordingly, because terminal retention base 326 can be positioned below terminal contact surfaces 130 of female housing 100 in pre-lock position 10, terminal retention arm 332 is not within terminal apertures 114 in pre-lock position 10. In this way, guide surface 336 and the portion of back wall 330 supporting terminal retention contact surface 334 are not within terminal apertures 114 in pre-lock position 10. Because terminal retention arm 332 is not within terminal apertures 114 in pre-lock position 10, installed terminal segments 402 can extend through terminal apertures 114 without contacting terminal retention arm 332. Accordingly, terminal retention arm 332 and terminal segments 402 can fail to be in blocking engagement such that they are retained and prevented from being unintentionally removed. Therefore, TPA member 300 can fail to reinforce or secondarily lock terminal segments 402 to provide terminal position assurance in pre-lock position 10. Visual feedback of a portion of TPA member 300 extending outwardly from bottom 112 of female housing 100 can signal that TPA member 300 is in pre-lock position 10 such that TPA member 300 can fail to provide reinforcement or secondary locking to installed terminal segments 402.

Figure 9:
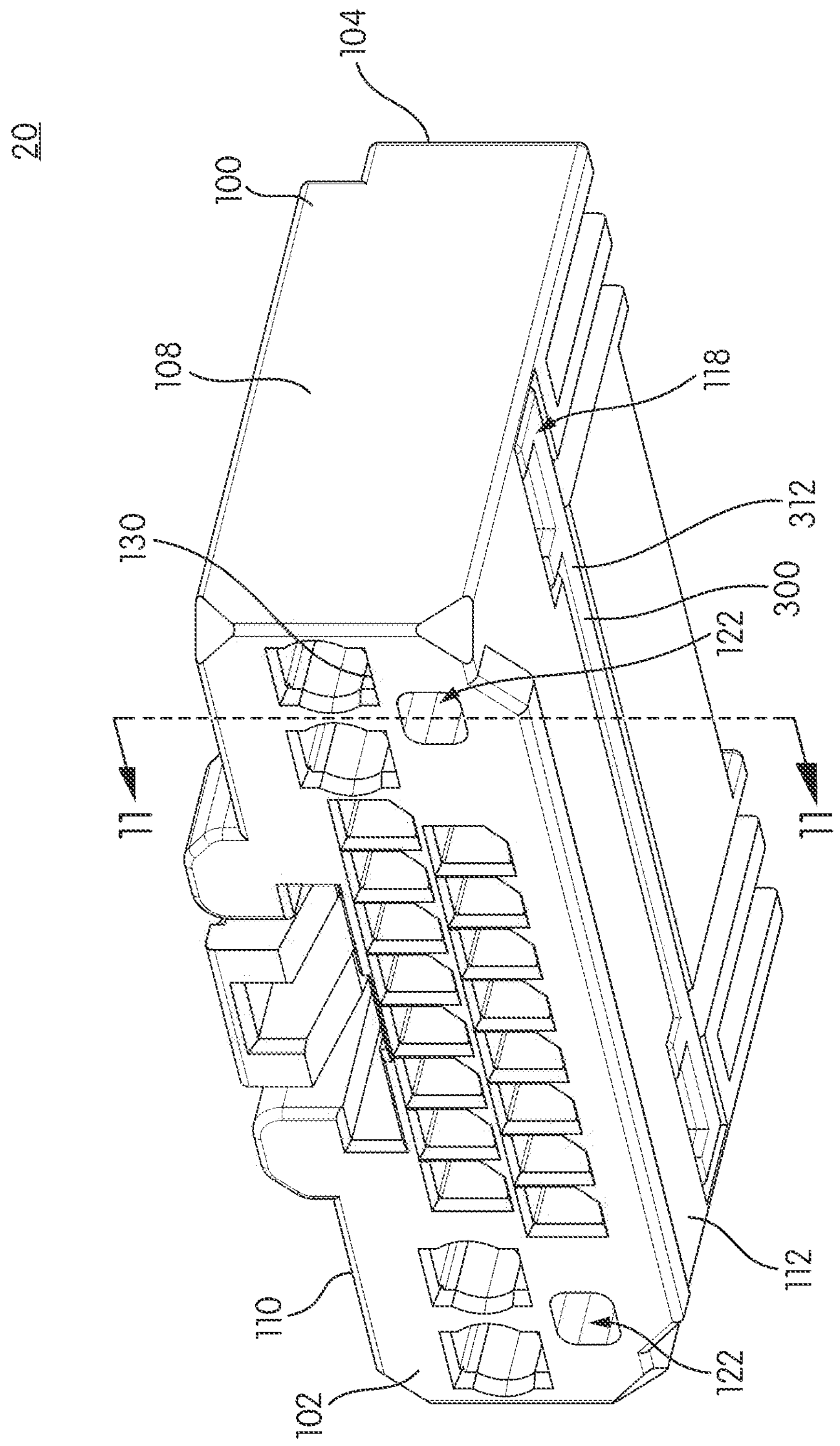
FIG. 9 is a perspective view of the female connector housing and terminal position assurance member of FIG. 1.
Figure 10:
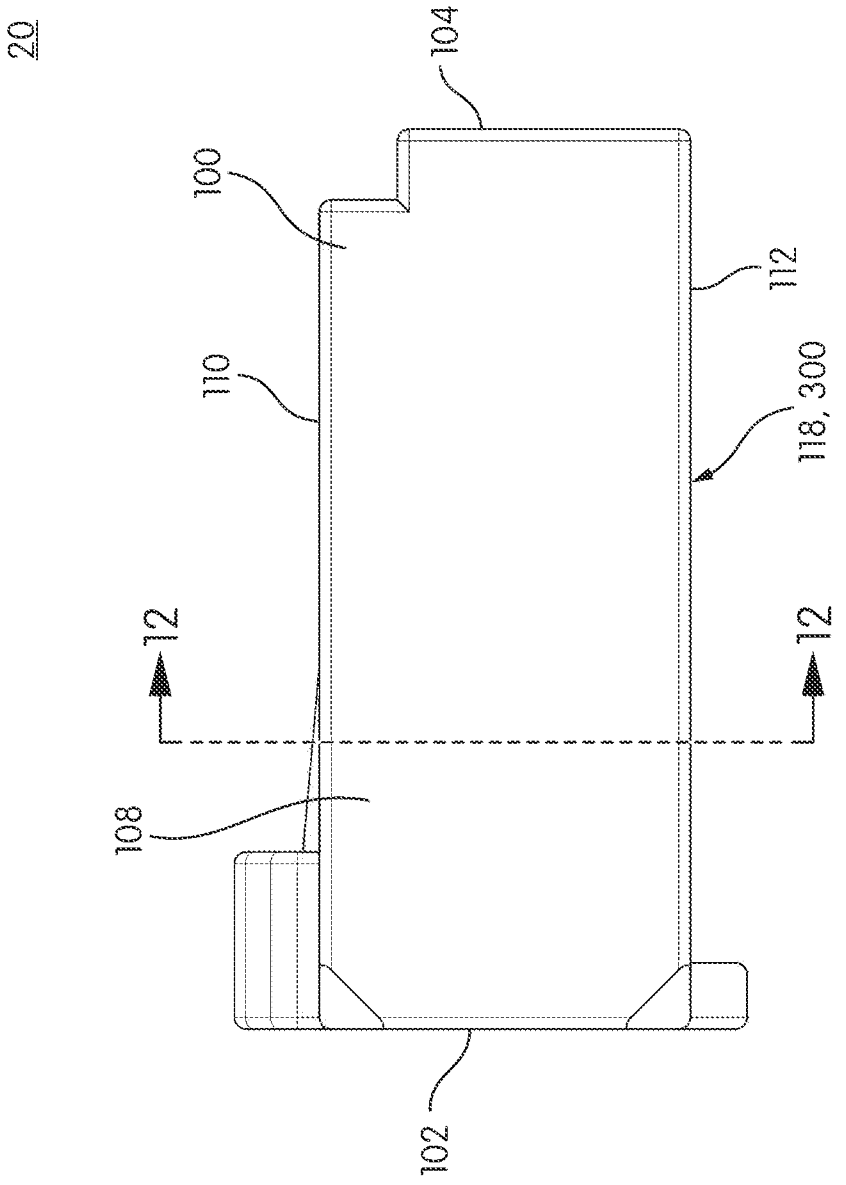
FIG. 10 is a side view of the female connector housing and terminal position assurance member of FIG. 1.

As shown in FIGS. 9-11, TPA member 300 can be in final lock position 20. To move TPA member 300 to final lock position 20, after terminal segments 402 are inserted into female housing 100, TPA member 300 can be moved upward into female housing 100 within terminal aperture 118 toward top 110 of female housing 100 in a longitudinal direction generally parallel to longitudinal axis 9 (FIG. 11). Once in final lock position 20, TPA member 300 can be entirely within female housing 100 such that bottom 312 of TPA member 300 does not extend below bottom 112 of female housing 100. Visual feedback of TPA member 300 being entirely disposed in female housing 100 can signal that TPA member 300 is in final lock position 20. In an aspect, sidewall 120 of terminal aperture 118 can prevent further movement of TPA member 300 into female housing 100 such that TPA member 300 provides assurance that final lock position 20 is achieved.

Notably, TPA member 300 cannot be moved upward in a longitudinal direction generally parallel to longitudinal axis 9 (FIG. 11) within TPA member aperture 118 if terminal segments 402 (FIG. 15) are only partially mated. Because terminal aperture 118 can intersect terminal apertures 114, terminal segments 402 disposed in terminal apertures 114 that are not fully inserted can block TPA member 300 from being moved upward within terminal aperture 118. Accordingly, TPA member 300 can be prevented from providing reinforcement or secondary locking of terminal segments 402. In this way, the visual feedback of TPA member 300 being entirely disposed in female housing 100 and related tactile and/or audible feedback of disposing TPA member 300 entirely within female housing 100 is significant. This feedback can provide assurance that terminal segments 402 are installed with reinforcement or secondary locking.

In pre-lock position 10, TPA member 300 can be retained in female housing 100 by retention detent 318 (FIG. 7). TPA member 300 cannot be moved upward in a longitudinal direction generally parallel to longitudinal axis 9 (FIG. 11) if terminal segments 402 are only partially mated, as discussed above. Thus, to move TPA member 300 upward toward top 110 of female housing 100 in a longitudinal direction generally parallel to longitudinal axis 9 such that TPA member 300 can be in final lock position 20, terminal segments 402 must be installed and disposed in terminal apertures 114. To move TPA member 300 into female housing 100, lock arms 314 can be deflected inward away from the biased position. In an aspect, lock arms 314 can deflect inward in a transverse direction generally parallel to transverse axis 8 (FIG. 11). In another aspect, TPA member 300 can be moved into female housing 100 to deflect lock arms 314 inward. A clearance can exist between aperture sidewalls 120 and TPA member 300 to allow lock arms 314 to move within TPA member aperture 118 in the transverse direction away from the biased position. In an aspect, bottom edges 338 of retention detents 318 can be beveled to pass flat top edge 128 of retention wall 124 such that lock arms 314 can be deflected inward. In addition, in an aspect, bottom edge 126 of retention wall 124 can be chamfered to allow flat top edges 322 of locking detents 320 to pass such that TPA member 300 can move to final lock position 20. TPA member 300 can then be moved into female housing 100 toward top 110 of female housing 100 in a longitudinal direction generally parallel to longitudinal axis 9.

In an aspect, an audible and/or tactile feedback signal (e.g., an audible click sound) can be produced to indicate that TPA member 300 is in final lock position 20 in addition to the visual feedback of the entire TPA member 300 being within female housing 100. This feedback can provide assurance that terminal segments 402 are installed with reinforcement or secondary locking.

As shown in FIG. 11, a lock arm 314 can deflect outward to its biased position once it is positioned above retention wall 124. In an aspect, lock arm 314 can deflect outward in a transverse direction generally parallel to transverse axis 8. In this way, locking detent 320 can be disposed in retention aperture 122. Accordingly, in final lock position 20, retention detent 318 and locking detent 320 of lock arm 314 can both be disposed in retention aperture 122 above retention wall 124. In some aspects, locking detents 320 of all lock arms 314 on TPA member 300 can be disposed in retention aperture 122 above retention wall 124 in final lock position 20. In some aspects, retention wall 124 can form part of bottom 112 of female housing 100. In some aspects, because retention wall 124 can form part of bottom 112 of female housing 100, locking detent 320 can be disposed below bottom 112 in pre-lock position 10.

In some aspects, retention aperture 122 being within female housing 100 can reduce the overall profile of the connector. In some aspects, disposing locking detent 320 in retention aperture 122 to move TPA member 300 to final lock position 20 can reduce the overall profile of the connector because retention aperture 122 is within female housing 100.

TPA member 300 can be moved downward to reset the assembly of female housing 100 and TPA member 300 to release terminal segments 402 such that the terminals are disconnected, or facilitate maintenance, for example. In this way, TPA member 300 can return to pre-lock position 10 (FIG. 7). To return to pre-lock position 10 from final lock position 20, TPA member 300 can be moved downward away from top 110 of female housing 100 in a longitudinal direction generally parallel to longitudinal axis 9 (FIG. 11). To move TPA member 300 downward, lock arms 314 can deflect inward in a transverse direction generally parallel to transverse axis 8 (FIG. 11) away from the biased position. In an aspect, bottom edges 324 of locking detents 320 can be beveled to pass flat top edge 128 of retention wall 124 such that lock arms 314 can deflect inward. TPA member 300 can then be moved downward away from top 110 of female housing 100. Retention detents 318 can engage retention wall 124 as described above to retain TPA member 300 in female housing 100 once pre-lock position 10 is achieved.

Figure 12:
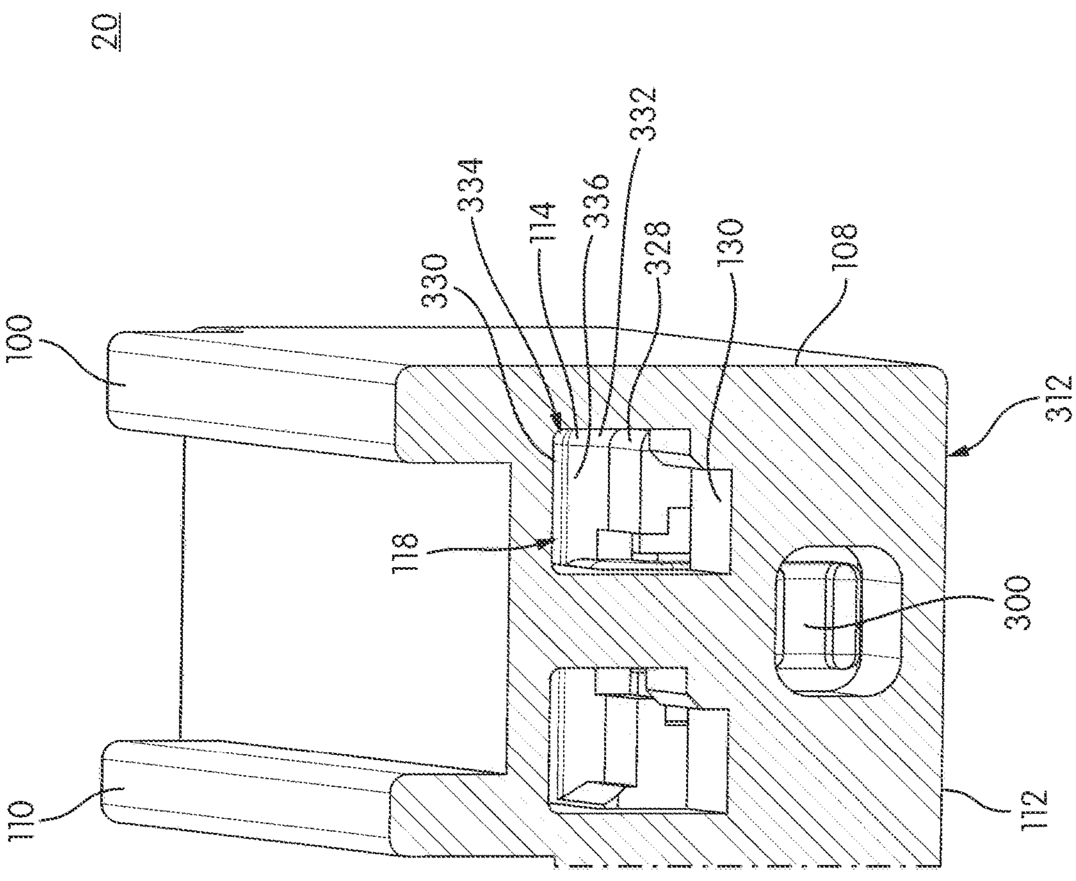
FIG. 12 is a perspective cross-sectional view of the female connector housing and terminal position assurance member in FIG. 10 along line 12-12.

As shown in FIGS. 10 and 12, in some aspects, terminal contact surface 334 of TPA member 300 can generally adjoin with terminal contact surfaces 130 of female housing 100 when the assembly of female housing 100 and TPA member 300 is in final lock position 20. In some aspects, terminal contact surfaces 328 and terminal contact surfaces 130 can extend along a common flat plane. In this way, terminal contact surfaces 334 can additionally be within terminal apertures 114 to receive terminal segments 402 (FIG. 13).

Similar to a terminal contact surface 334, in some aspects, a terminal retention arm 332 can be within a terminal aperture 114 in final lock position 20. In this way, guide surface 336 and the portion of back wall 330 supporting terminal retention contact surface 334 can be within terminal aperture 114 in final lock position 20. Because terminal retention arm 332 is within terminal aperture 114 in final lock position 20, terminal segment 402 can be in blocking engagement with TPA member 300 such that it is retained and prevented from being unintentionally removed. Accordingly, TPA member 300 can reinforce or secondarily lock terminal segments 402 to provide terminal position assurance in final lock position 20.

As shown in FIGS. 13-15, terminal segments 402 can be received in terminal apertures 114 by terminal contact surfaces 130 of female housing 100 and terminal contact surface 334 of TPA member 300. Terminal segments 402 can then advance through terminal apertures 114, guided by terminal retention arms 332. In an aspect, terminal segments 402 advance through terminal apertures 114 in a transverse direction generally parallel to transverse axis 8 (FIG. 11). As shown in FIG. 15, terminal segments 402 can cross terminal retention arms 332 as they are advanced through terminal apertures 114. In an aspect, a guide surface 336 of a terminal retention arm 332 can be inclined to assist a terminal segment 402 in advancing through a terminal aperture 114. Once terminal of a terminal segment 402 is installed in a terminal aperture 114, in some aspects, a terminal retention arm 332 and a portion of terminal segment 402 can tightly fit in terminal aperture 114 in final lock position 20.

Once a terminal of a terminal segment 402 is installed in a terminal aperture 114, in some aspects, terminal retention arm 332 and terminal segment 402 can be in blocking engagement in final lock position 20. In some aspects, the terminal retention contact surface 334 portion of back wall 330 of a terminal retention base 326 can be in blocking engagement with terminal segment 402. In an aspect, a portion of terminal segments 402 can extend downwardly toward bottom 112 of female housing 100 in a longitudinal direction generally parallel to transverse axis 9 (FIG. 11) when installed in terminal apertures 114. Accordingly, each terminal segment 402 can extend over at least two sides of a terminal retention arm 332. In an aspect, if a terminal segment 402 is pulled toward front 102 of female housing 100 in a transverse direction generally parallel to transverse axis 8 (FIG. 11), the downwardly extending portion of terminal segment 402 can engage a terminal retention contact surface 334 to halt transverse movement of terminal segment 402 such that terminal segment 402 is retained. Accordingly, terminal retention contact surface 334 can exert a force on terminal segment 402 to provide reinforcement/secondary locking and prevent removal. Thus, TPA member 300 in final lock position 20 can provide assurance that the position of the terminal segments 402 is maintained and that terminal segments 402 cannot be unintentionally removed.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A connector, comprising:

a housing comprising a first aperture and a second aperture, the second aperture bound by a retention wall of the housing;

a terminal position assurance member disposed in the first aperture and comprising a top configured to face toward an internal surface of the housing; and an arm extending downwardly from the top of the terminal position assurance member comprising a first detent and a second detent, the first detent and second detent extending outwardly from the arm, and the first detent and second detent disposed on either side of the retention wall in a first position of the terminal position assurance member and in the second aperture in a second position of the terminal position assurance member.

2. The connector of claim 1, wherein a flat side surface of the arm between the first detent and the second detent abuts a flat surface of the retention wall in the first position.

3. The connector of claim 1, wherein the arm is deflected inward toward a base of the terminal position assurance member to move between the first position and the second position.

4. The connector of claim 3, wherein a flat top edge of the second detent engages a beveled bottom edge of the retention wall to move from the first position to the second position.

5. The connector of claim 3, wherein a chamfered bottom edge of the second detent engages flat top edge of the retention wall to move from the second position to the first position.

6. The connector of claim 1, wherein a bottom flat surface of the arm below the second detent abuts the retention wall in the second position.

7. The connector of claim 1, wherein the first aperture is intermediate to a front wall and a back wall of the housing.

8. The connector of claim 1, wherein the terminal position assurance member is entirely within the housing in the second position, such that a bottom of the terminal position assurance member does not extend below a bottom of the housing.

9. The connector of claim 1, further comprising a second housing to receive the first housing and the terminal position assurance member when in the second position.

10. A terminal position assurance member, comprising:

a top configured to face toward an internal surface of a housing;

a terminal retention base comprising:

a terminal contact surface to receive a terminal extending to a first height;

a terminal retention arm adjacent to the terminal retention surface extending to a second height above the first height; and an inclined guide surface connecting the terminal contact surface with the terminal retention arm;

an arm positioned adjacent to the terminal retention base and extending downwardly from the top of the terminal position assurance member;

a first detent extending outwardly from the arm; and a second detent extending outwardly from the arm and positioned below the first detent.

11. The terminal position assurance member of claim 10, wherein the terminal retention arm comprises an inclined surface extending to a back wall of the terminal retention arm.

12. The terminal position assurance member of claim 10, wherein the terminal position assurance member is entirely within a housing retaining the terminal, such that a bottom of the terminal position assurance member does not extend below a bottom of the housing.

13. The terminal position assurance member of claim 10, wherein a bottom edge of the second detent engages the housing to retain a terminal.

14. The terminal position assurance member of claim 10, further comprising a second terminal retention base, wherein the first terminal retention base and the second terminal retention base adjacent the arm on two opposite sides.

15. The terminal position assurance member of claim 10, wherein the first detent and the second detent extend from the arm to the same surface as the terminal retention base.

16. A method of retaining a terminal in a connector, the method comprising:

providing a terminal position assurance member in a first aperture of a housing, with a top of the terminal position assurance member facing toward an internal surface of the housing;

providing a first detent on an arm extending downwardly from the top of the terminal position assurance member in a second aperture of the housing;

deflecting the arm inward;

extending a second detent on the arm into the second aperture; and receiving the entire terminal position assurance member in the housing, such that a bottom of the terminal position assurance member does not extend below a bottom of the housing.

17. The method of claim 16, further comprising receiving the housing in a second housing.

18. The method of claim 16, further comprising aligning a bottom surface of the arm with a top surface of a retention wall of the housing, wherein the second aperture is bound by the retention wall.

19. The method of claim 16, further comprising aligning a terminal contact surface of the terminal position assurance member with a terminal contact surface of the housing.

20. The method of claim 19, wherein a terminal retention arm extends to a first height above a second height of the terminal contact surface of the terminal position assurance member, and wherein when the entire terminal position assurance member is received in the housing, the terminal retention arm exerts a force on the terminal to prevent withdrawal of the terminal.

* * * * *